United States Patent
Wu et al.

(10) Patent No.: US 10,078,257 B2
(45) Date of Patent: Sep. 18, 2018

(54) OSCILLATING LENS MODULE AND PROJECTOR

(71) Applicant: Coretronic Corporation, Hsin-Chu (TW)

(72) Inventors: Shang-Hsuang Wu, Hsin-Chu (TW); Tsung-Ching Lin, Hsin-Chu (TW); Chih-Cheng Chou, Hsin-Chu (TW)

(73) Assignee: Coretronic Corporation, Hsinchu (TW)

(*) Notice: Subject to any disclaimer, the term of this patent is extended or adjusted under 35 U.S.C. 154(b) by 161 days.

(21) Appl. No.: 15/134,399

(22) Filed: Apr. 21, 2016

(65) Prior Publication Data
US 2017/0003578 A1    Jan. 5, 2017

(30) Foreign Application Priority Data
Jul. 1, 2015  (CN) .......................... 2015 1 0375771

(51) Int. Cl.
*G03B 21/14*    (2006.01)
*G03B 5/00*    (2006.01)

(52) U.S. Cl.
CPC ............. *G03B 21/142* (2013.01); *G03B 5/00* (2013.01); *G03B 2205/0069* (2013.01)

(58) Field of Classification Search
CPC ...................... G03B 2205/0069; G03B 21/142
USPC ....................................................... 353/30, 97
See application file for complete search history.

(56) References Cited

U.S. PATENT DOCUMENTS

| | | | |
|---|---|---|---|
| 2010/0149613 | A1 | 6/2010 | Yoda |
| 2015/0277104 | A1* | 10/2015 | Hino ...................... G02B 26/08 359/199.3 |

FOREIGN PATENT DOCUMENTS

| | | |
|---|---|---|
| CN | 2624512 | 7/2004 |
| CN | 2769910 | 4/2006 |
| CN | 1875537 | 12/2006 |
| CN | 101075772 | 11/2007 |
| CN | 101952764 | 1/2011 |
| CN | 104638871 | 5/2015 |
| DE | 10242091 | 4/2004 |
| JP | 2007225768 | 9/2007 |
| TW | 262509 | 11/1995 |
| TW | I292832 | 1/2008 |

OTHER PUBLICATIONS

"Office Action of China Counterpart Application," dated Nov. 1, 2017, p. 1-p. 5.

*Primary Examiner* — Steven H Whitesell Gordon
*Assistant Examiner* — Jerry Brooks
(74) *Attorney, Agent, or Firm* — JCIPRNET

* cited by examiner

(57) ABSTRACT

The invention discloses an oscillating lens module and a projector. The oscillating lens module includes a frame, a first coil, a lens, and a second coil. The first coil and the second coil are connected to the frame and located in a magnetic field, wherein the first coil and the second coil are adapted to be electrified and to oscillate about a first axis and a second axis respectively via the magnetic field. The lens is connected to the first coil, wherein the lens is adapted to oscillate along with the first coil. An oscillation phase of the second coil is opposite to an oscillation phase of the first coil, such that forces applied on the frame by the first coil and the second coil are counterbalanced, so as to prevent the oscillating lens module from over vibrating which makes projection images shake and makes noise.

14 Claims, 3 Drawing Sheets

OSCILLATING LENS MODULE AND PROJECTOR

CROSS-REFERENCE TO RELATED APPLICATION

This application claims the priority benefit of China application serial no. 201510375771.3, filed on Jul. 1, 2015. The entirety of the above-mentioned patent application is hereby incorporated by reference herein and made a part of this specification.

BACKGROUND OF THE INVENTION

Field of the Invention

The invention relates to a lens module and a projector, more specifically, relates to an oscillating lens module and a projector having the oscillating lens module.

Description of Related Art

The imaging principle of the projector is that the illumination light beam generated by the light source is converted to the image light beam via the light valve, and then the image light beam is projected through the projection lens to a screen or a wall to form an image. With improvements in projector technology and a drop in manufacturing costs, applications of projectors have gradually expanded from commercial use to household use.

In the field of projection technology, in order to pursue a better imaging quality, an oscillating lens module could be added between the light valve and the projection lens. By the refraction effect of the image light beam passing through the lens module from the light valve and the reciprocating oscillation of the lens module, the serration degree of the projection image could be reduced to make the projection image smoother. Specifically, the existing oscillating lens module uses the magnetic interaction between the coil and the permanent magnet to make the coil generate reciprocating oscillation, so as to drive the lens to generate reciprocating oscillation. Simultaneously, the influence of the oscillation generated by the coil is transferred to other structures of the projector to cause the resonance of the projector, which makes the projection image shake and makes vibrating noise.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides an oscillating lens module and a projector, in which the projector is prevented from over vibrating caused by the oscillating lens module.

The other objectives and advantages of the invention can be further understood through the technical features disclosed in the invention.

In order to achieve one of, a part of or all of the above-mentioned advantages, or to achieve other advantages, an embodiment of the invention proposes an oscillating lens module which includes a frame, a first coil, a lens, and a second coil. The first coil is connected to the frame and located in a magnetic field, wherein the first coil is adapted to be electrified to oscillate about a first axis via the magnetic field. The lens is connected to the first coil, wherein the lens is adapted to oscillate along with the first coil. The second coil is connected to the frame and located in the magnetic field, wherein the second coil is adapted to be electrified to oscillate about a second axis via the magnetic field. An oscillation phase of the second coil is opposite to an oscillation phase of the first coil.

In order to achieve one of, a part of or all of the above-mentioned advantages, or to achieve other advantages, an embodiment of the invention proposes a projector which includes a light source, a light valve, a projection lens, and a wavelength conversion module. The light source is adapted to provide an illumination light beam. The light valve is adapted to convert the illumination light beam to an image light beam. The projection lens is adapted to project the image light beam. The oscillating lens module includes a frame, a first coil, a lens, and a second coil. The first coil is connected to the frame and located in a magnetic field, wherein the first coil is adapted to be electrified to oscillate about a first axis via the magnetic field. The lens is connected to the first coil and located on the transmission path of the image light beam, wherein the lens is adapted to oscillate along with the first coil. The second coil is connected to the frame and located in the magnetic field, wherein the second coil is adapted to be electrified to oscillate about a second axis via the magnetic field. An oscillation phase of the second coil is opposite to an oscillation phase of the first coil.

Based on the above, the embodiments of the invention have at least one of the advantages or effects below. In the oscillating lens module of the invention, except for disposing the first coil which is used to drive the lens to oscillate, the second coil corresponding to the first coil is further disposed, and the oscillation phase of the second coil is configured to be opposite to the oscillation phase of the first coil. Accordingly, when the oscillating lens module actuates, the vibration applied on the frame via the first coil could be counterbalanced by the vibration applied on the frame via the second coil. Thus, the vibration of the oscillating lens module is eliminated before transferring to other structures of the projector, such that the projector is prevented from over vibrating caused by the oscillating lens module, so as to guarantee that shaking of the projection image and excessive vibrating noise are not generated during the operation of the projector.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
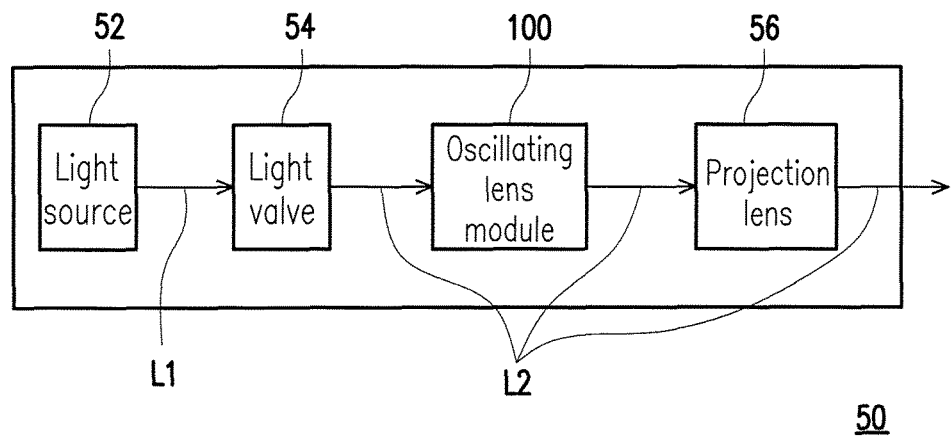
FIG. 1 is a schematic view of a projector using an oscillating lens module of one embodiment of the invention.

FIG. 1 is a schematic view of a projector of one embodiment of the invention. Referring to FIG. 1, a projector 50 of the embodiment includes a light source 52, a light valve 54, a projection lens 56, and an oscillating lens module 100. The light source 52 is adapted to provide an illumination light beam L1, the light valve 54 is adapted to convert the illumination light beam L1 to an image light beam L2, the projection lens 56 is adapted to project the image light beam L2 to a display plane so as to fours a projection image for the user to watch. The oscillating lens module 100 is located on the transmission path of the image light beam L2, and utilizes the refraction effect of the image light beam L2 passing through the lens module 100 from the light valve 54 and the reciprocating oscillation of the lens module 100, for achieving the effect of reducing the serration degree of the projection image, such that the projection image is smoother.

Figure 2:
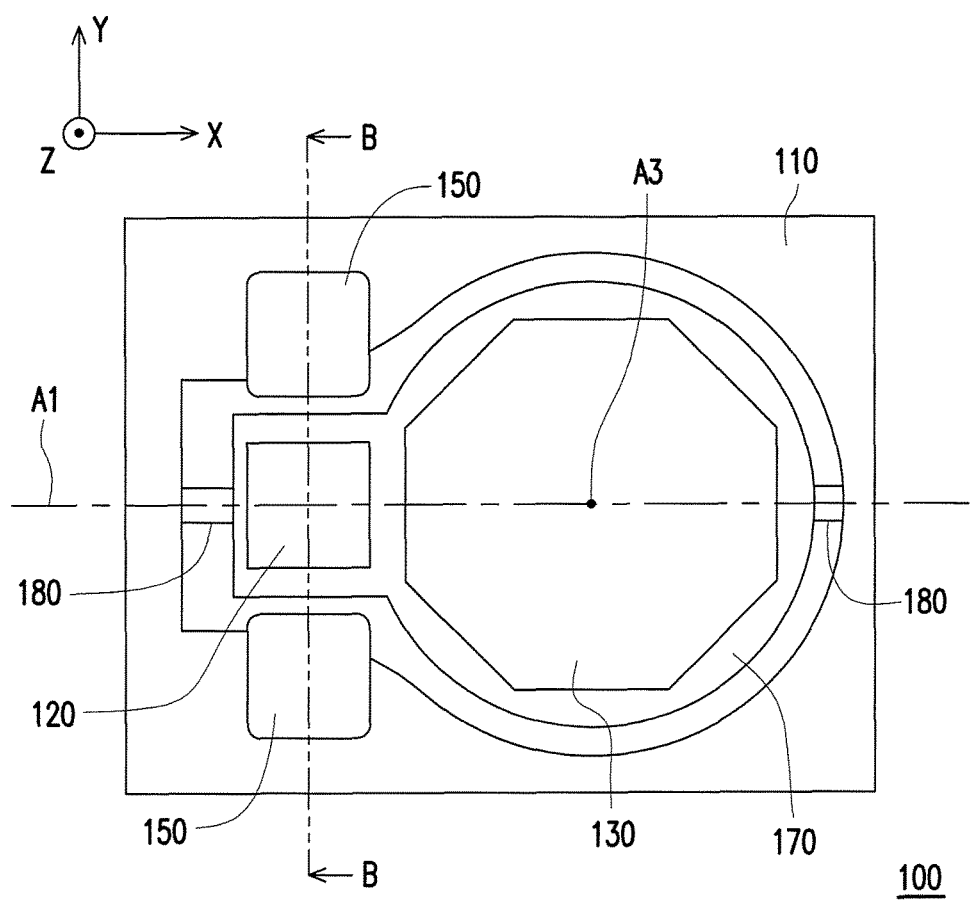
FIG. 2 is a schematic view of the oscillating lens module in FIG. 1.
Figure 3:
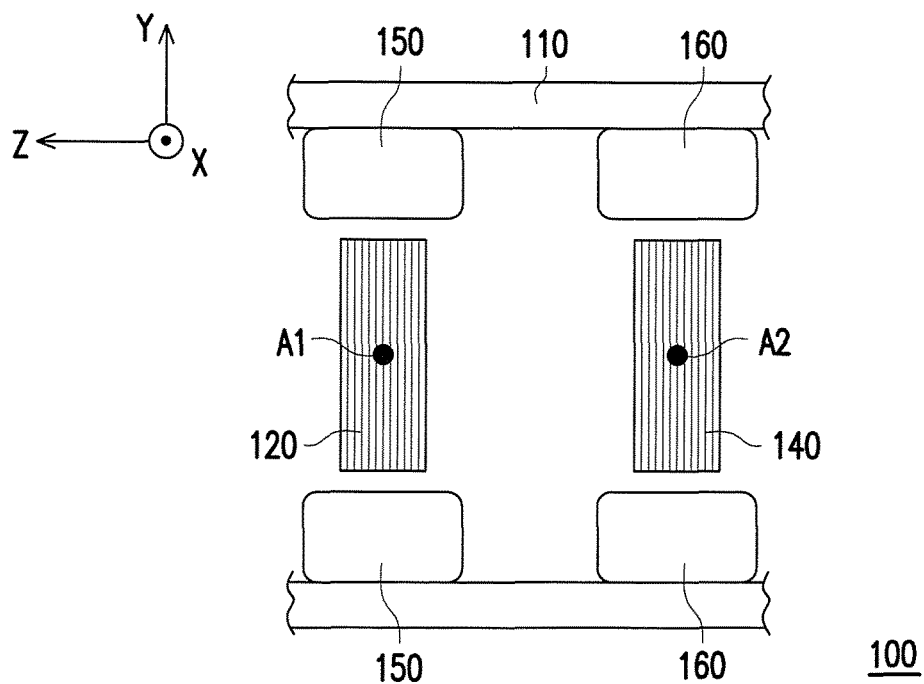
FIG. 3 is a schematic cross-sectional view along a section line B-B of a part of the members of the oscillating lens module in FIG. 2.

FIG. 2 is a schematic view of the oscillating lens module in FIG. 1. FIG. 3 is a schematic cross-sectional view along a section line B-B of a part of the members of the oscillating lens module in FIG. 2. Referring to FIG. 2 and FIG. 3, the oscillating lens module 100 of the embodiment includes a frame 110, a first coil 120, a lens 130, a second coil 140, at least a first magnetic member 150, and at least a second magnetic member 160 (two first magnetic members 150 and two second magnetic members 160 are schematically shown in FIG. 2 and FIG. 3). The frame 110 is, for example, an external frame of the oscillating lens module 100. The first coil 120 and the second coil 140 are connected to the frame 110, and the lens 130 is connected to the first coil 120 and located on the transmission path of the image light beam L2 as shown in FIG. 1. The first magnetic members 150, such as permanent magnets, are disposed on the frame 110 and located on two opposite sides of the first coil 120. The second magnetic members 160, such as permanent magnets, are disposed on the frame 110 and respectively located on two opposite sides of the second coil 140 (the first magnetic member 150 and the second magnetic member 160 being disposed on two opposite sides of the first coil 120 and the second coil 140 respectively is schematically shown in FIG. 3, but the invention is not limited thereto). The first magnetic member 150 and the second magnetic member 160 are adapted to generate a magnetic field, and the first coil 120 and the second coil 140 are located in the magnetic field. In other embodiments, the magnetic field can be generated by other appropriate configurations. For example, the magnetic field includes a first sub-magnetic field (not shown) and a second sub-magnetic field (not shown), wherein the first magnetic member 150, for example, generates the first sub-magnetic field and the first coil 120 is located in the first sub-magnetic field. The second magnetic member 160, for example, generates the second sub-magnetic field and the second coil 140 is located in the second sub-magnetic field. Moreover, the number of the first magnetic members 150 and the number of the second magnetic members 160 could be different, the number of the first magnetic members 150 could be only one or greater than three, the number of the second magnetic members 160 could also be one or greater than three, but the invention is not limited thereto.

The first coil 120 is adapted to be electrified to oscillate about a first axis A1 via the magnetic field, and the lens 130 is adapted to oscillate about the first axis A1 along with the first coil 120, so as to achieve an effect that the serration degree of the projection image is reduced. In addition, the second coil is adapted to be electrified to oscillate about a second axis A2 via the magnetic field, and an oscillation phase of the second coil 140 is configured to be opposite to an oscillation phase of the first coil 120. Accordingly, when the oscillating lens module 100 actuates, the vibration applied on the frame 110 via the first coil 120 could be counterbalanced by the vibration applied on the frame 110 via the second coil 140. Thus, the vibration of the oscillating lens module 100 is eliminated before transferring to other structures of the projector 50, such that the projector 50 is prevented from over vibrating caused by the oscillating lens module 100, so as to guarantee that shaking of the projection image and excessive vibrating noise are not generated during the operation of the projector 50 in FIG. 1. It is noted that, as referenced in FIG. 2 (not shown), the oscillating lens module 100 in the embodiment is based on one first coil 120 and one second coil 140 arranged in a pair. However, the number of the first coil 120 and the number of the second coil 140 could all be greater than two, and the first coils 120 and the second coils 140 could be, for example, respectively disposed at two opposite ends of the lens 130, in order to increase the overall stability of the oscillating lens module 100, but the invention is not limited thereto.

Figure 4A:
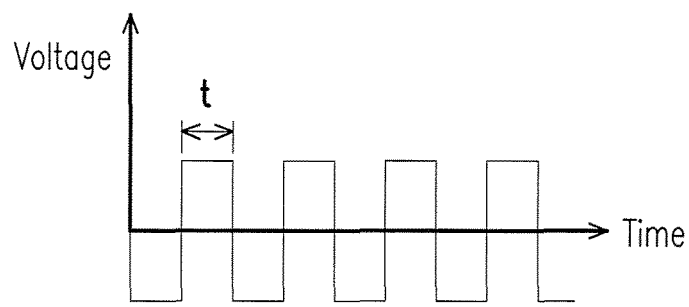
FIG. 4A shows an input voltage of a first coil in FIG. 3 varying over time.
Figure 4B:
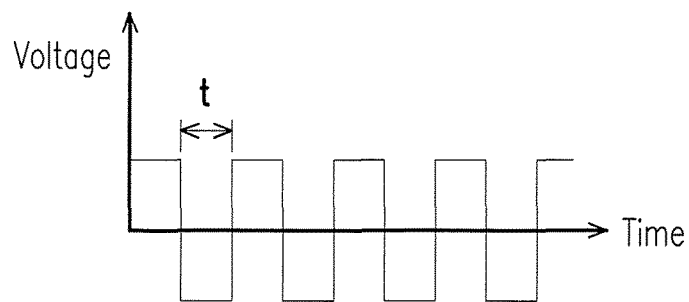
FIG. 4B shows an input voltage of a second coil in FIG. 3 varying over time.
Figure 5A:
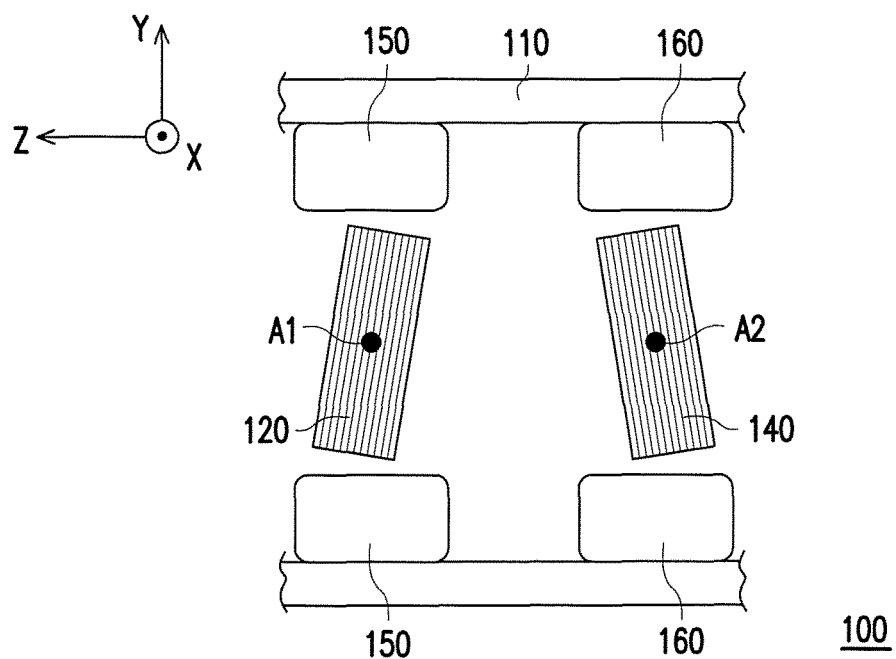
FIG. 5A shows the oscillating state of the first coil and the second coil in FIG. 3 at a point in time.
Figure 5B:
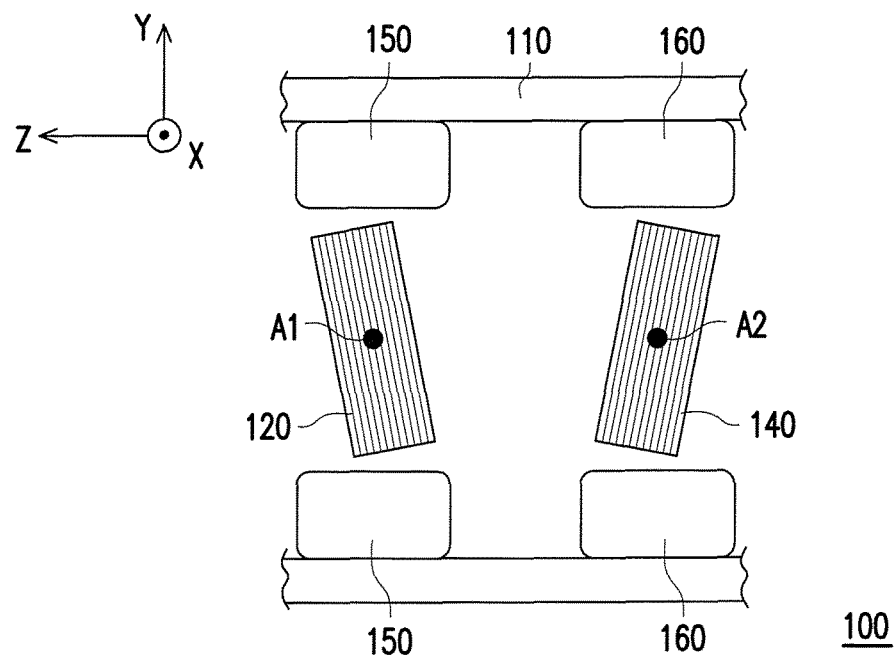
FIG. 5B shows the oscillating state of the first coil and the second coil in FIG. 3 at another point in time.

FIG. 4A shows an input voltage of a first coil in FIG. 3 varying over time. FIG. 4B shows an input voltage of a second coil in FIG. 3 varying over time. FIG. 5A shows the oscillating state of the first coil and the second coil in FIG. 3 at a point in time. FIG. 5B shows the oscillating state of the first coil and the second coil in FIG. 3 at another point in time. In the embodiment, the first coil 120, for example, generates oscillation via the input voltage shown in FIG. 4A, and the second coil 140, for example, generates oscillation via the input voltage shown in FIG. 4B, wherein a control unit (such as a central processing unit (CPU), a digital signal processor (DSP), or other appropriate control unit) is electrically coupled to the first coil 120 and the second coil 140. The input voltage shown in FIG. 4A and the input voltage shown in FIG. 4B are controlled to be electrically opposite at the same point in time, so that the directions of current of the first coil 120 and the second coil 140 are opposite to each other, and the oscillation phases of the first coil 120 and the second coil 140 are opposite at each point in time as shown in FIG. 5A and FIG. 5B. The time duration t as shown in FIG. 4A and FIG. 4B is, for example, several milliseconds or other appropriate time duration, but the invention is not limited thereto. In addition, in other embodiments, the first coil 120 and the second coil 140 are controlled to have opposite oscillating directions via other voltage input method or other appropriate configurations, and the invention is not limited thereto.

Referring to FIG. 2, in the embodiment, the oscillating lens module 100 further includes a supporting structure 170. The supporting structure 170, such as an inner frame of the oscillating lens module 100, supports the first coil 120 and the lens 130, so that the lens 130 is connected to the first coil 120 via the supporting structure 170 and adapted to oscillate along with the first coil 120. In addition, the oscillating lens module 100 in the embodiment further includes two flexible elastic members 180, and the flexible elastic member 180 is, for example, a metal spring plate or other types of elastic body. Two opposite ends of the supporting structure 170 are respectively connected to the frame 110 via the two flexible elastic members 180, so that the supporting structure 170, and the first coil 120 and the lens 130 thereon could oscillate relatively to the frame 110 via the two flexible elastic members 180. Since the elastic deformation capability of the flexible elastic member 180 is limited, the oscillation angle of the lens 130 could be restricted. In other embodiments, the first coil 120 and the lens 130 could be connected to each other by other appropriate methods, the number of the flexible elastic members 180 could also be only one, and the flexible elastic member 180 could be connected to the frame 110 by other appropriate methods, but the invention is not limited thereto.

The lens 130 is, for example, a flat lens which is inserted into an accommodating through hole on the supporting structure 170, and the surface of the lens 130 could be optionally coated with an anti-reflection layer (AR coating), wherein the lens 130 is, for example, made of glass, transparent resin, or other appropriate materials, and the lens 130 could also have a dioptric value, but the invention is not limited thereto. The lens 130 has an optical axis A3, the image light beam L2 as shown in FIG. 1 passes through the lens 130 along the optical axis A3 and transfers to the projection lens 56. The oscillation axis of the first coil 120 (the first axis A1) is, for example, not parallel to the optical axis A3, such that the oscillation generated by the lens 130 along the first axis A1 could effectively make the image light beam L2 generate the refraction effect, so as to achieve the effect that the serration degree of the projection image is reduced as described above. As schematically shown in FIG. 2 and FIG. 3, the first axis A1 is parallel with the X direction, the optical axis A3 is parallel with the Z direction, and thus the first axis A1 is perpendicular to the optical axis A3. However, the invention is not limited thereto, the angle between the first axis A1 and the optical axis A3 could be an acute angle greater than 0 degree and smaller than 90 degree. In addition, in the embodiment, the oscillation axis of the first coil 120 (the first axis A1) and the oscillation axis of the second coil 140 (the second axis A2) are, for example, parallel to each other, so that the oscillation generated by the second coil 140 could be effectively counterbalanced by the oscillation generated by the first coil 120. However, in other embodiments, the second axis A2 could also be designed to be unparalleled to the first axis A1 for conforming with overall spatial arrangement of the oscillating lens module 100 or for cooperating with the degree of resonance of the oscillating lens module 100, but the invention is not limited thereto.

In summary, the embodiments of the invention have at least one of the advantages or effects below. In the oscillating lens module of the invention, except for disposing the first coil which is used to drive the lens to oscillate, the second coil corresponding to the first coil is further disposed, and the oscillation phase of the second coil is configured to be opposite to the oscillation phase of the first coil. Accordingly, when the oscillating lens module actuates, the vibration applied on the frame via the first coil could be counterbalanced by the vibration applied on the frame via the second coil. Thus, the vibration of the oscillating lens module is eliminated before transferring to other structures of the projector, such that the projector is prevented from over vibrating caused by the oscillating lens module, so as to guarantee that shaking of the projection image and excessive vibrating noise are not generated during the operation of the projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An oscillating lens module, comprising:
   a frame;
   a first coil, connected to the frame and located in a magnetic field, wherein the first coil is adapted to be electrified to oscillate about a first axis via the magnetic field,
   a lens, connected to the first coil, wherein the lens is adapted to oscillate along with the first coil; and
   a second coil, connected to the frame and located in the magnetic field, wherein the second coil is adapted to be electrified to oscillate about a second axis via the magnetic field, and an oscillation phase of the second coil is opposite to an oscillation phase of the first coil,
   wherein the second coil is adapted to oscillate opposite to the lens,
   wherein a vibration applied on the frame via the first coil is counterbalanced by a vibration applied on the frame via the second coil.

2. The oscillating lens module as recited in claim 1, comprising at least a first magnetic member and at least a second magnetic member, wherein the at least a first magnetic member is disposed on the frame and respectively located on two opposite sides of the first coil, the at least a second magnetic member is disposed on the frame and respectively located on two opposite sides of the second coil, and the magnetic field is generated by the at least a first magnetic member and the at least a second magnetic member.

3. The oscillating lens module as recited in claim 1, comprising a supporting structure, wherein the supporting structure supports the first coil and the lens.

4. The oscillating lens module as recited in claim 3, comprising two flexible elastic members, wherein two opposite ends of the supporting structure are respectively connected to the frame via the two flexible elastic members.

5. The oscillating lens module as recited in claim 1, wherein the lens has an optical axis, a light beam passes through the lens along the optical axis, and the first axis is not parallel to the optical axis.

6. The oscillating lens module as recited in claim 5, wherein the first axis is perpendicular to the optical axis.

7. The oscillating lens module as recited in claim 1, wherein the first axis is parallel to the second axis.

8. A projector, comprising:
   a light source, adapted to provide an illumination light beam;
   a light valve, adapted to convert the illumination light beam to an image light beam;
   a projection lens, adapted to project the image light beam; and
   an oscillating lens module, comprising:
      a frame;
      a first coil, connected to the frame and located in a magnetic field, wherein the first coil is adapted to be electrified to oscillate about a first axis via the magnetic field;
      a lens, connected to the first coil and located on the transmission path of the image light beam, wherein the lens is adapted to oscillate along with the first coil; and
      a second coil, connected to the frame and located in the magnetic field, wherein the second coil is adapted to be electrified to oscillate about a second axis via the magnetic field, and an oscillation phase of the second coil is opposite to an oscillation phase of the first coil,
   wherein the second coil is adapted to oscillate opposite to the lens,
   wherein a vibration applied on the frame via the first coil is counterbalanced by a vibration applied on the frame via the second coil.

9. The projector as recited in claim 8, wherein the oscillating lens module comprises at least a first magnetic member and at least a second magnetic member, the at least a first magnetic member is disposed on the frame and respectively located on two opposite sides of the first coil, the at least a second magnetic member is disposed on the frame and respectively located on two opposite sides of the second coil, and the magnetic field is generated by the at least a first magnetic member and the at least a second magnetic member.

10. The projector as recited in claim 8, wherein the oscillating lens module comprises a supporting structure, and the supporting structure supports the first coil and the lens.

11. The projector as recited in claim 10, wherein the oscillating lens module comprises two flexible elastic members, and two opposite ends of the supporting structure are respectively connected to the frame via the two flexible elastic members.

12. The projector as recited in claim 8, wherein the lens has an optical axis, the image light beam passes through the lens along the optical axis, and the first axis is not parallel to the optical axis.

13. The projector as recited in claim 12, wherein the first axis is perpendicular to the optical axis.

14. The projector as recited in claim 8, wherein the first axis is parallel to the second axis.

* * * * *